(12) United States Patent
Sakai

(10) Patent No.: US 8,465,710 B2
(45) Date of Patent: Jun. 18, 2013

(54) REACTOR

(75) Inventor: Kenji Sakai, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 141 days.

(21) Appl. No.: 13/074,912

(22) Filed: Mar. 29, 2011

(65) Prior Publication Data

US 2011/0250102 A1 Oct. 13, 2011

(30) Foreign Application Priority Data

Mar. 29, 2010 (JP) .................. 2010-075377

(51) Int. Cl.
*B01J 8/04* (2006.01)
*B01J 10/00* (2006.01)

(52) U.S. Cl.
USPC .......... 422/637; 422/216; 422/218; 422/219; 422/635; 422/636; 422/646

(58) Field of Classification Search
USPC ................ 422/216, 218, 219, 635, 636, 637, 422/646
See application file for complete search history.

(56) References Cited

U.S. PATENT DOCUMENTS

| | | | |
|---|---|---|---|
| 2,149,300 A * | 3/1939 | Lassiat | 422/201 |
| 3,186,935 A * | 6/1965 | Vaell | 208/59 |
| 3,372,988 A | 3/1968 | Hansen | |
| 3,799,866 A * | 3/1974 | Lengemann | 208/139 |
| 4,423,022 A | 12/1983 | Albano et al. | |

FOREIGN PATENT DOCUMENTS

| | | |
|---|---|---|
| DE | 3318098 A1 | 11/1984 |
| DE | 10031347 A1 | 1/2001 |
| DE | 202007006812 U1 | 9/2008 |
| JP | H03-131336 | 6/1991 |

OTHER PUBLICATIONS

European Search Report dated Jun. 30, 2011 in corresponding Application No. 11159591.4.

* cited by examiner

*Primary Examiner* — Jill Warden
*Assistant Examiner* — Lessanework Seifu
(74) *Attorney, Agent, or Firm* — Knobbe Martens Olson & Bear LLP

(57) ABSTRACT

There is provided a radial flow reactor having a multi-pass structure in which loading and unloading of granular packing are easy and which does not impair the reaction performance. The reactor includes, in an upright tubular reactor vessel: a packing region for housing a continuous packed bed of granular packing; and an outer and an inner passages disposed outside and inside the packing region, respectively, allowing a fluid to flow in the axial direction. The reactor is configured so that the fluid can pass between the packing region and the outer passage and between the packing region and the inner passage.

6 Claims, 4 Drawing Sheets

REACTOR

BACKGROUND

1. Field of the Invention

The present invention relates to a reactor containing a packed bed of a catalyst, an absorbent or the like, and particularly to a reactor called a radial flow reactor configured such that a reactor vessel thereof is tubular and a fluid passes through the packed bed in a radial direction thereof.

2. Background of the Invention

In a typical radial flow reactor, the reactor is cylindrical and is disposed upright. Inside a reactor vessel, a center pipe, a packed bed, and an outer basket are arranged in this order from the center outward in a cross section perpendicular to the axial direction of the reactor, namely, in a horizontal cross section. The center pipe is located in the center in the horizontal cross section to form a fluid passage (an inner passage) extending in the axial direction. Fluid can move inside the inner passage in the axial direction and can pass through the wall of the center pipe in the radial direction. The packed bed, which is a continuous bed of granular packing, is disposed around the center pipe and has an annular cross section in the horizontal cross section. A fluid passage (an outer passage) located around the packed bed is formed between the outer basket and an inner surface of the reactor vessel. Fluid can move inside the outer passage in the axial direction and can pass through the wall of the outer basket in the radial direction. The fluid supplied to the reactor vessel flows inside the center pipe in the axial direction, then flows inside the packed bed in the radial direction, and then flows outside the outer basket in the axial direction, or flows outside the outer basket in the axial direction, then flows inside the packed bed in the radial direction, and then flows inside the center pipe in the axial direction. Subsequently, the fluid is discharged from the reactor vessel. When the fluid flows inside the packed bed in the radial direction, a catalytic reaction or an adsorption reaction may occur.

Compared with an axial flow reactor in which the fluid inside the packed bed flows in the axial direction, in the case of the radial flow reactor, it is easy to increase the passage area (cross-sectional area of the passage) of the fluid and reduce the passage thickness (length of the passage) of the packed bed. Therefore, it is easy to reduce the pressure drop between the inlet and the outlet of the reactor. For such an advantage, the radial flow reactor is suitably used when reacting a large amount of fluid while preventing the increase of the pressure drop in the reactor.

In recent years, reactors have been required to be larger in size due to economic or social demands. In this case, due to economic or technical reasons, the common practice is to increase the length of the reactor rather than the diameter of the reactor for a larger size. If the diameter is relatively small, it is possible to construct a pressure vessel using a relatively thinner plate.

However, in the case of the radial flow reactor, when the length of the reactor is increased rather than the diameter of the reactor for a larger size, the fluid passage area may be excessively increased, and hence the flow rate of the fluid in the packed bed may become very low and the pressure loss in the packed bed may become excessively small. Thus, it may be difficult to obtain a uniformly distributed flow with respect to the passage area in the packed bed. In that case, an outer basket or a center pipe having complicated structure is often used in order to intentionally generate resistance to the flow (pressure loss) and to forcibly obtain a uniformly distributed flow with respect to the passage area.

Further, in the case of a radial flow reactor in which heat transfer tubes for heating or cooling are inserted into a packed bed, when the length of the reactor is increased rather than the diameter of the reactor for a larger size, the fluid flow speed in the packed bed may be reduced and a sufficient heat transfer performance may not be achieved.

Such problems can be solved by allowing a fluid to flow through multiple passes in the radial flow reactor.

U.S. Pat. No. 3,372,988 discloses a radial flow reactor with a multi-pass structure in which a gas passes through a catalyst bed a plurality of times. The reactor includes a partition plate which divides the catalyst bed into two or three in the axial direction so that gas passes through the catalyst bed in the radial direction two or three times while the flow direction of the gas is reversed.

JP H03-131336A discloses a radial flow reactor having a packed bed not divided into a plurality of beds, namely, a continuous packed bed. The reactor includes a blocking section disposed in a center pipe to prevent gas from passing in the axial direction and in the radial direction. The reactor also includes a blocking section disposed in an outer basket to prevent gas from passing in the axial direction and in the radial direction. The position of the blocking section arranged in the center pipe is different from the position of the blocking section arranged in the outer basket in the axial direction. These blocking sections change the gas flow direction to allow the gas to pass through the packed bed a plurality of times.

SUMMARY OF THE INVENTION

As disclosed in U.S. Pat. No. 3,372,988, in the multi-pass structure in which the packed bed is divided, the partition plate is mechanically fixed to the center pipe and the outer basket. Therefore, when loading or unloading the granular packing, it is necessary to access the partition structure. For example, when loading catalyst to the space below the partition plate, it is necessary to temporarily remove the partition plate which divides the catalyst bed. Further, in the case of reactor in which heat transfer tubes for heating or cooling are inserted into the packed bed, it is very difficult to access the partition plate, and hence it is difficult to employ such a multi-pass structure.

The structure disclosed in JP H03-131336A can solve the above problem since the structure has no partition plate. However, since the packed bed is not partitioned, gas takes a shortcut near the blocking section. For example, in the vicinity of the blocking section of the center pipe, the gas which has flowed from the center pipe into the catalyst bed does not flow in the radial direction but flows in the axial direction, and returns to the center pipe without flowing into the outer basket. Therefore, the advantages of the radial flow reactor are impaired and the reaction performance of the reactor is low.

An object of the present invention is to provide a radial flow reactor having a multi-pass structure in which loading and unloading of packing are easily carried out and which does not impair the reaction performance of the reactor.

The present invention provides a reactor including, in an upright disposed tubular reactor vessel: a packing region which is a region for housing a continuous packed bed of granular packing; and an outer passage and an inner passage disposed outside and inside the packing region, respectively, in a cross section perpendicular to the axial direction of the reactor vessel, each of the outer and inner passages allowing a fluid to flow therethrough in the axial direction, the reactor being configured so that the fluid is able to pass between the packing region and the outer passage and the fluid is able to pass between the packing region and the inner passage, wherein the reactor further includes at least one of the partition structures from among:

an outer partition structure including: a partition plate (hereinafter referred to as an outer partition plate) partitioning the packing region in the axial direction with a gap through which the granular packing is able to pass between an inner border of the packing region and this partition plate (outer partition plate); and a blocking section for preventing the fluid from flowing through the outer passage in the axial direction; and an inner partition structure including: a partition plate (hereinafter referred to as an inner partition plate) partitioning the packing region in the axial direction with a gap through which the granular packing is able to pass between an outer border of the packing region and this partition plate (inner partition plate); a blocking section for preventing the fluid from flowing through the inner passage in the axial direction.

In the at least one of the partition structures, the partition plate preferably has an upward inclination toward a side having the gap.

The inclination may have an angle of 15° to 50°.

The angle of the inclination is preferably equal to or greater than an angle of repose of the granular packing.

The partition plate is preferably equipped with a tube for unloading the granular packing.

The reactor may include a heat transfer tube inside the packing region.

The heat transfer tube is preferably supported by the partition plate.

The present invention provides a radial flow reactor having a multi-pass structure in which loading and unloading of packing are easily carried out and which does not impair the reaction performance of the reactor.

DETAILED DESCRIPTION OF THE INVENTION

Hereinafter, embodiments of the present invention will be described with referring to the accompanying drawings, but the present invention is not limited thereto.

Figure 1:
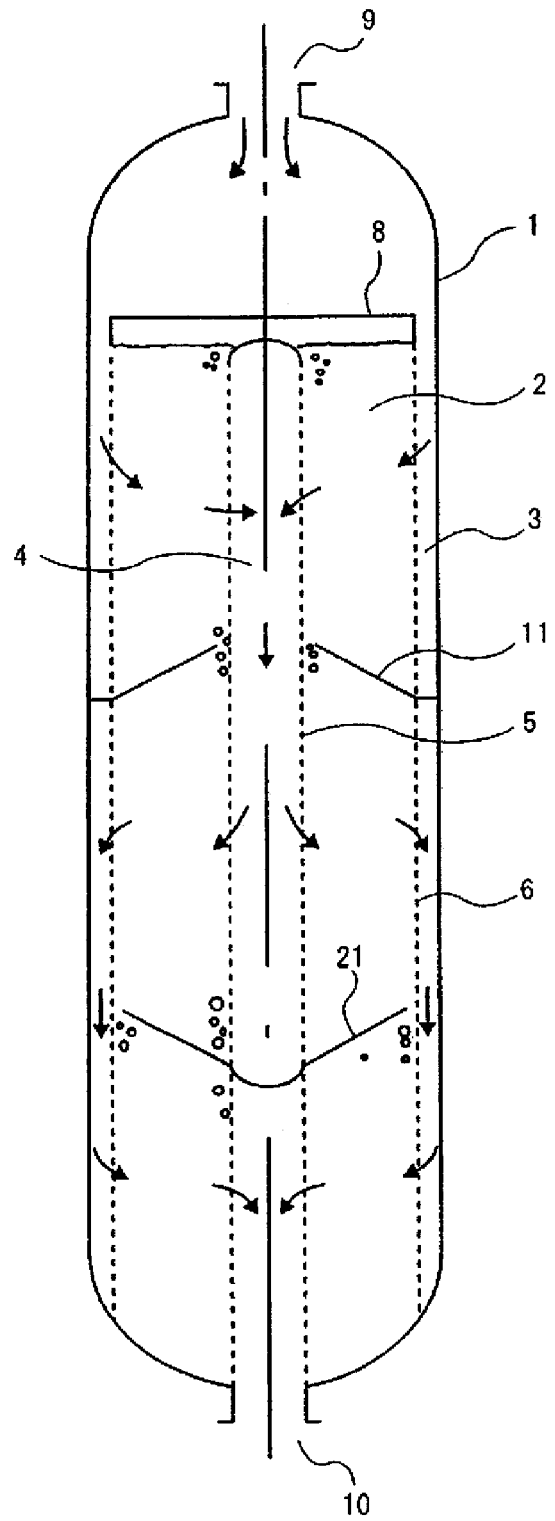
FIG. 1 is a schematic view of an axial cross section for illustrating an embodiment of a reactor of the present invention.

FIG. 1 is a schematic view illustrating a cross section including the axis of the reactor. The reactor includes, inside a tubular, particularly cylindrical reactor vessel 1, a packing region 2, an outer passage 3, and an inner passage 4.

The reactor is a vertical reactor disposed upright. In other words, the reactor is installed such that the axis of the reactor is vertical. Examples of the reactor may include a methanol synthesis reactor, an ammonia synthesis reactor, a hydrodesulfurization reactor for kerosene or gas oil, and a flue gas desulfurization reactor.

The fluid flowing inside the reactor may be a gas, a liquid, or a mixture thereof (gas-liquid two-phase flow).

The packing region houses a continuous packed bed packed with granular packing. Examples of the granular packing may be particles of a catalyst, an absorbent or the like.

The shape of the granular packing is typically spherical or cylindrical and the particle size of the packing is approximately from 1 mm to 15 mm in general.

The outer passage 3 is a passage which is disposed outside the packing region 2 in a cross section perpendicular to the axial direction of the reactor vessel and which allows fluid to flow therethrough in the axial direction. The inner passage 4 is a passage which is disposed inside the packing region 2 in a cross section perpendicular to the axial direction of the reactor vessel and which allows fluid to flow therethrough in the axial direction. Typically, the inner passage, the packing region, and the outer passage are arranged concentrically with the reactor vessel.

The inner passage is formed by an empty space inside a center pipe 5. The packing region is formed between the center pipe 5 and an outer basket 6. The outer passage is formed by an empty space between the outer basket 6 and the reactor vessel 1 (particularly, a shell of the reactor vessel).

The center pipe 5 is configured so that fluid can pass but granular packing cannot pass between the packing region and the inner passage. The center pipe may be obtained in such a manner that for example, a wire mesh, a profile wire screen or a punching plate is used to form a tube, particularly a cylindrical tube, having a large number of through-holes allowing the fluid to pass but preventing the granular packing from passing therethrough and the upper end of the tube is closed. The lower end of the center pipe may be connected to a fluid outlet 10 (or may be connected to a fluid inlet). The diameter of the through-holes of the center pipe is smaller than the diameter of the granular packing so as to prevent the granular packing from moving between the packing region 2 and the inner passage 4.

The outer basket 6 is configured so that fluid can pass but granular packing cannot pass between the packing region 2 and the outer passage 3. The outer basket may be formed in such a manner that for example, a wire mesh, a profile wire screen or a punching plate is used to form a tube, particularly a cylindrical tube, having a large number of through-holes allowing the fluid to pass but preventing the granular packing from passing therethrough and the upper end of the tube is closed by a lid 8. The diameter of the through-holes of the outer basket is also smaller than the diameter of the granular packing so as to prevent the granular packing from moving between the packing region and the outer passage.

Figure 2:
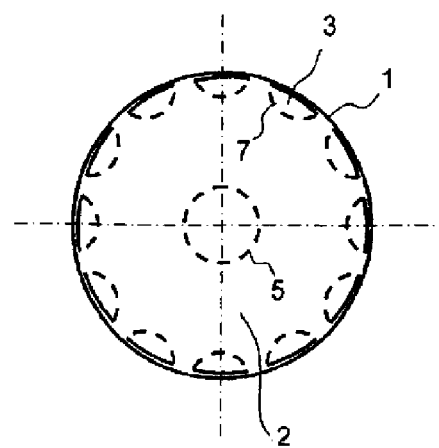
FIG. 2 is a schematic view of a cross section perpendicular to the axis for illustrating an embodiment of the reactor in which scallops are used to form outer passages.

Note that in FIG. 1, and also in FIGS. 2 and 6 which will be described later, a broken line indicates a portion allowing fluid to pass but preventing granular packing from passing therethrough.

The outer basket may be replaced with a plurality of tubular members arranged along the inner wall (inner peripheral surface) of the reactor vessel. Examples of the tubular member may include a tubular member called "scallop", of which cross section is shaped like a scallop shell. FIG. 2 is a schematic view of a cross section perpendicular to the axial direction illustrating a reactor equipped with scallops. Note that no partition structure is shown in FIG. 2. The scallop 7 has a shape of a tube which has been split along the axial direction. Its rear side is covered by a plate which is shaped to fit the inner surface of the reactor. Each scallop is arranged on the inner side of the reactor vessel to form an empty space in each scallop. The empty space serve as the outer passage 3, and the packing region 2 is formed between the scallops and the center pipe 5. The scallop may also be formed using a wire mesh, a profile wire screen, or a punching plate. A tube which constitutes the scallop may be arranged so that the upper end thereof communicates with an upper space of the reactor.

The reactor includes one or more partition structures selected from an outer partition structure 11 and an inner partition structure 21 so that fluid flows in the packed bed in the radial direction. When there is only one partition structure, any one of the outer partition structure and the inner partition structure may be used. When there are two or more partition structures, the outer partition structure and the inner partition structure are provided alternately in the axial direction.

Figure 3:
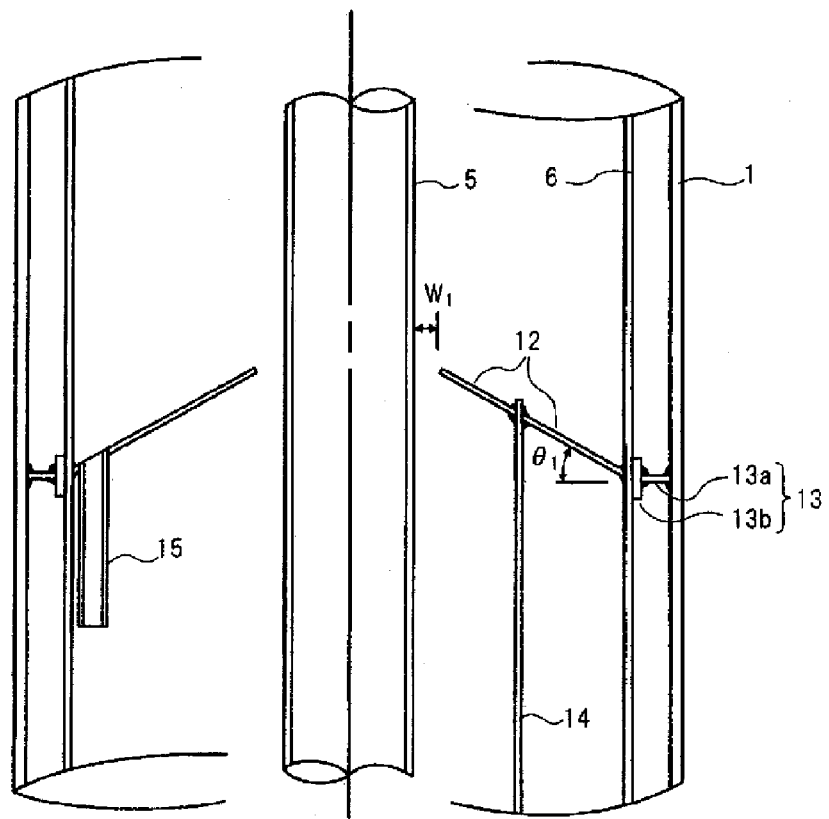
FIG. 3 is an enlarged schematic view for illustrating an embodiment of an outer partition structure.

FIG. 3 is an enlarged view of an example of the outer partition structure. Note that in FIG. 3, and also in FIGS. 4 and 5 which will be described later, although not specifically shown in the drawings, fluid can pass between the inside and the outside of the center pipe 5 and between the inside and the outside of the outer basket 6. The outer partition structure includes a partition plate (an outer partition plate) 12. The outer partition plate partitions the packing region in the axial direction, namely, vertically with a gap allowing the granular packing to pass therethrough between the inner border of the packing region and the outer partition plate. The outer partition plate is, for example, annular when viewed from above. An outer end of the outer partition plate 12 may be fixed to the outer basket 6, for example, by welding. An inner end of the outer partition plate does not contact the center pipe, and a gap is formed between the inner end of the outer partition plate and the center pipe. The width W1 of this gap is set to a size allowing the granular packing to pass therethrough.

A tie rod 14 may be provided to support the partition plate. The tie rod may be fixed to the partition plate, for example, by welding. Further, the tie rod may be fixed to the reactor vessel (the fixed portion is not shown in the drawings), for example, by welding.

Figure 4:
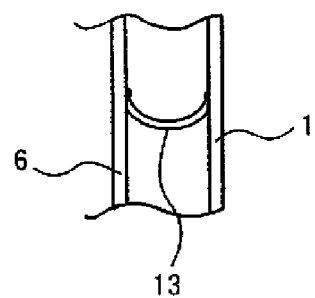
FIG. 4 is a schematic view of an axial cross section for illustrating an embodiment of a blocking section disposed in the outer passage.

The outer partition structure 11 includes a blocking section (an outer blocking section) 13 for preventing the fluid from flowing through the outer passage in the axial direction. The structure of the outer blocking section may be any structure capable of preventing the fluid from flowing through the outer passage in the axial direction. However, preferably, the structure can absorb the difference in thermal expansion between the reactor vessel 1 and the outer basket 6. As illustrated in FIG. 3, the outer blocking section 13 may include a structure in which a tubular member 13b is fixed to the inner end of an annular plate 13a, for example, by welding. The annular plate 13a may be fixed to the reactor vessel 1, for example, by welding. The tubular member 13b contacts the outer surface of the outer basket 6, but is not fixed to the outer basket. Thus, the difference in thermal expansion can be absorbed by a structure in which the outer blocking section is fixed to one of the reactor vessel and the outer basket, but is not fixed to and just contacts the other of them. FIG. 4 illustrates another example of the outer blocking section. This outer blocking section can be formed by fixing a bellows with an annular shape viewed from the axial direction to each of the reactor vessel 1 and the outer basket 6, for example, by welding. The bellows can absorb the difference in thermal expansion.

The outer blocking section and the outer partition plate are arranged so as to change the fluid flow direction from the axial direction to the radial direction or from the radial direction to the axial direction. Therefore, the positions in the axial direction of the outer end of the outer partition plate 12 and the inner end of the outer blocking section 13 may be the same so that the outer partition plate and the outer blocking section can work together to guide the fluid smoothly.

Figure 5:
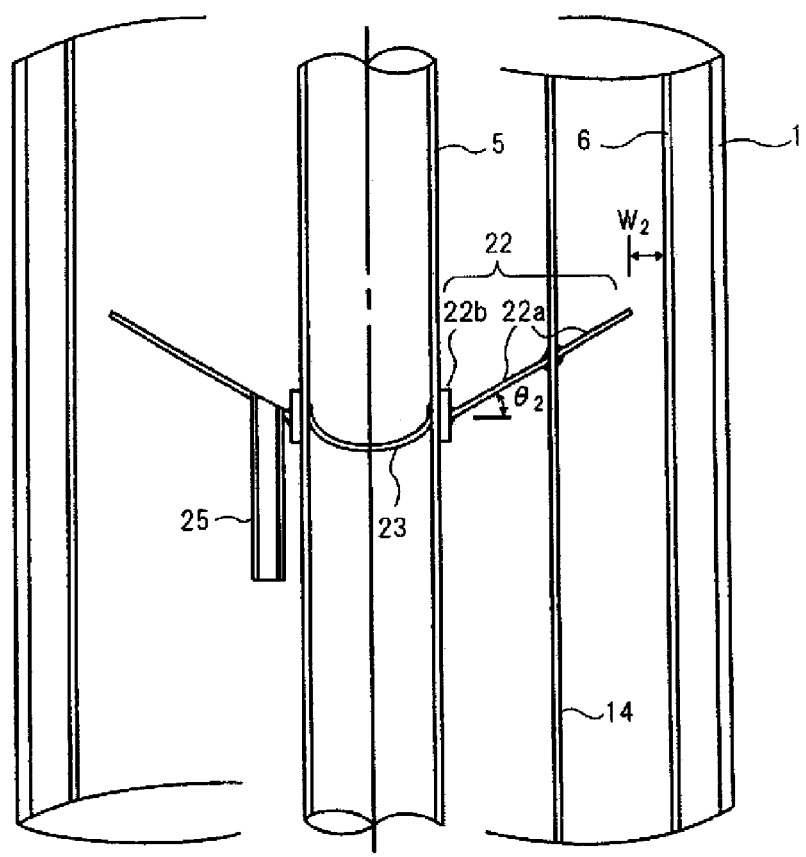
FIG. 5 is an enlarged schematic view for illustrating an embodiment of an inner partition structure.

FIG. 5 is an enlarged view of an example of the inner partition structure. The inner partition structure includes a partition plate (an inner partition plate) 22. The inner partition plate partitions the packing region in the axial direction, namely, vertically with a gap allowing the granular packing to pass therethrough between the outer border of the packing region and the inner partition plate. The inner partition plate 22 may include a structure in which, for example, a tubular member 22b is fixed to the inner end of a plate 22a which is annular when viewed from the axial direction, for example, by welding. An inner end of the inner partition plate 22, namely, an inner peripheral surface of the tubular member 22b contacts the center pipe 5 but is not fixed to the center pipe. The inner partition plate may be fixed to the tie rod 14, for example, by welding. The inner partition plate may consist only of the annular plate 22a, and the annular plate 22a may be fixed to the center pipe, for example, by welding. However, if the inner partition plate is arranged movably with respect to the center pipe as described above, it is possible to draw out the center pipe from the reactor. The configuration capable of drawing out the center pipe is effective especially in the case where an internal inspection is required, for example, in the case where heat transfer tubes are provided inside the reactor. The tie rod supporting the outer partition plate may be the same as the tie rod supporting the inner partition plate. The number of the tie rods may be appropriately determined.

The outer end of the inner partition plate does not contact the outer basket, and a gap is formed between the outer end of the inner partition plate and the outer basket. The width W2 of the gap is set to a size allowing a granular packing to pass therethrough.

The gap widths W1 and W2 may be appropriately determined according to the granular packing to be used, and for example, may be from 50 mm to 100 mm.

The inner partition structure 21 includes a blocking section (an inner blocking section) 23 for preventing the fluid from flowing through the inner passage in the axial direction. The structure of the inner blocking section may be any structure capable of preventing the fluid from flowing through the inner passage in the axial direction.

The inner blocking section and the inner partition plate are arranged so as to change the fluid flow direction from the axial direction to the radial direction or from the radial direction to the axial direction. Therefore, the positions in the axial direction of the inner end of the inner partition plate 22 and the outer end of the inner blocking section 23 may be the same so that the inner partition plate and the inner blocking section can work together to guide the fluid smoothly.

Referring to FIG. 1, a fluid flows in from a fluid inlet 9 of the reactor, and flows downward through the outer passage 3. The outer partition structure 11 prevents the fluid from flowing in the axial direction and the fluid can pass through the wall of the outer basket. Therefore, the fluid passes through the wall of the outer basket and flows through the packing region in the radial direction. The fluid can pass through the wall of the center pipe. Therefore, the fluid, after passing through the packing region inward in the radial direction, flows into the center pipe and flows downward in the axial direction. Then, the inner partition structure 21 changes the direction of the fluid flowing downward through the center pipe. More specifically, the fluid returns again from the center pipe to the packing region (a portion under the outer partition structure 11 and above the inner partition structure 21), and flows the packing region in the radial direction and reaches the outer passage 3. Then, the fluid flows through the outer passage downward in the axial direction. A lower cover of the reactor vessel 1 changes the flow direction of the fluid, and the fluid flows again through the packing region 2 in the radial direction and reaches the center pipe. The fluid flows from the center pipe to the fluid outlet 10 and is discharged from the reactor. Thus, the fluid may be passed from the top to the bottom, or alternatively from the bottom to the top.

By reducing the width W1 of the gap between the outer partition plate and the center pipe and the width W2 of the gap between the inner partition plate and the outer basket within a range in which the granular packing can pass through these gaps, influence of these gaps on the fluid flow can be made very small. Thus, the influence of these gaps on the reaction performance of the reactor is negligible.

When loading the granular packing into the packing region 2, the lid 8 of the outer basket is removed and the granular packing is poured into the packing region. At this time, the granular packing passes through the gap between the outer partition plate and the center pipe to be supplied to the packing region located under the outer partition plate 11. Further, the granular packing also passes through the gap between the inner partition plate and the outer basket to be supplied to the packing region located under the inner partition plate. Accordingly, it is possible to load the granular packing throughout the packing region without accessing the partition plates.

Each of the outer partition plate and the inner partition plate may be formed of a plate arranged perpendicular to the axial direction, namely, a horizontal plate. However, in this case, there may be formed a region under the partition plate in which no granular packing is packed. From the point of view of preventing this phenomenon, the partition plate preferably has an upward inclination toward the side having the gap. As illustrated in FIG. 3, the outer partition plate 12 may be conical in shape having an upward inclination toward the inside. The outer partition plate is inclined at an angle of $\theta 1$ to the horizontal. The inner partition plate 22, particularly the annular plate 22a may be conical in shape having an upward inclination toward the outside, as shown in FIG. 5. The inner partition plate is inclined at an angle of $\theta 2$ to the horizontal. Such an inclined configuration allows the granular packing, which has passed through the gap, to move to a region just under the partition plate. Thus, it is easy to prevent generation of a region having no granular packing under the partition plate.

The inclination angles $\theta 1$ and $\theta 2$ can be determined according to the granular packing used, and may be approximately from 15° to 50°, or further from 20° to 45°.

Each of the inclination angles $\theta 1$ and $\theta 2$ is preferably equal to or greater than an angle of repose of the granular packing. The angle of repose refers to the steepest angle of a slope maintaining stability without autonomous collapse when the granular packing is heaped up. The inclination angles equal to or greater than an angle of repose of the granular packing can easily prevent generation of a region having no granular packing under the partition plate even without particularly promoting the granular packing to move when loading the granular packing to the reactor.

When the granular packing is unloaded from the reactor, the granular packing can move through the gap between the outer partition plate 12 and the center pipe 5 and the gap between the inner partition plate 22 and the outer basket 6. Accordingly, it is possible to unload the granular packing without accessing the partition plates. However, some granular packing may remain on the partition plate. In such a case, for example, a vacuum hose can be used to remove the granular packing remaining on the partition plate. However, it is preferred that the partition plate is equipped with a tube for unloading granular packing so that the granular packing can move through this tube. As illustrated in FIG. 3, a tube 15 for unloading the granular packing may be provided as close to the outer end of the outer partition plate 12 as possible. As illustrated in FIG. 5, a tube 25 for unloading the granular packing may be provided as close to the inner end of the inner partition plate 22 as possible. Further, the inclined partition plate is effective in unloading the granular packing. For example, the inclination allows the granular packing to slide on the outer partition plate and drop through the tube 15 for unloading the granular packing. Thus, the granular packing can move autonomously.

Each length of the tubes 15 and 25 for unloading the granular packing is preferably as long as possible without disturbing other members and without disturbing the fluid flow, in order to suppress the bypass flow of the fluid passing through these tubes. The longer the tube length, the larger the pressure loss due to the tube, and thus the more excellently the bypass flow can be suppressed. Each length of the tubes 15 and 25 for unloading the granular packing may be, for example, from 500 mm to 1500 mm.

A discharge outlet, not shown in the drawings, for discharging the granular packing from the reactor vessel may be provided appropriately in a bottom portion of the reactor vessel. Alternatively, a gate, which can be opened and closed as needed, may be provided at the lower end of the center pipe and the granular packing may be discharged therefrom.

In the structure illustrated in FIG. 1, the fluid supplied to the reactor is first guided to the outer passage and the fluid is discharged from the inner passage to outside the reactor. However, the invention is not limited to such a configuration, and the fluid supplied to the reactor may first be guided to the inner passage, and further the fluid may be discharged from the outer passage to outside the reactor. Such variations can be obtained in such a manner that for example, a lid 8 is provided so as to contact an inner wall of the reactor vessel to close the upper end of the outer passage, and a center pipe 5 with its upper end opened is provided so as to penetrates the lid 8 to allow the upper end of the inner passage to be communicatively connected to the fluid inlet, and in such a manner that the lower end of the center pipe is closed, and a manifold for discharging the fluid is connected to the outer passage as needed.

Figure 6:
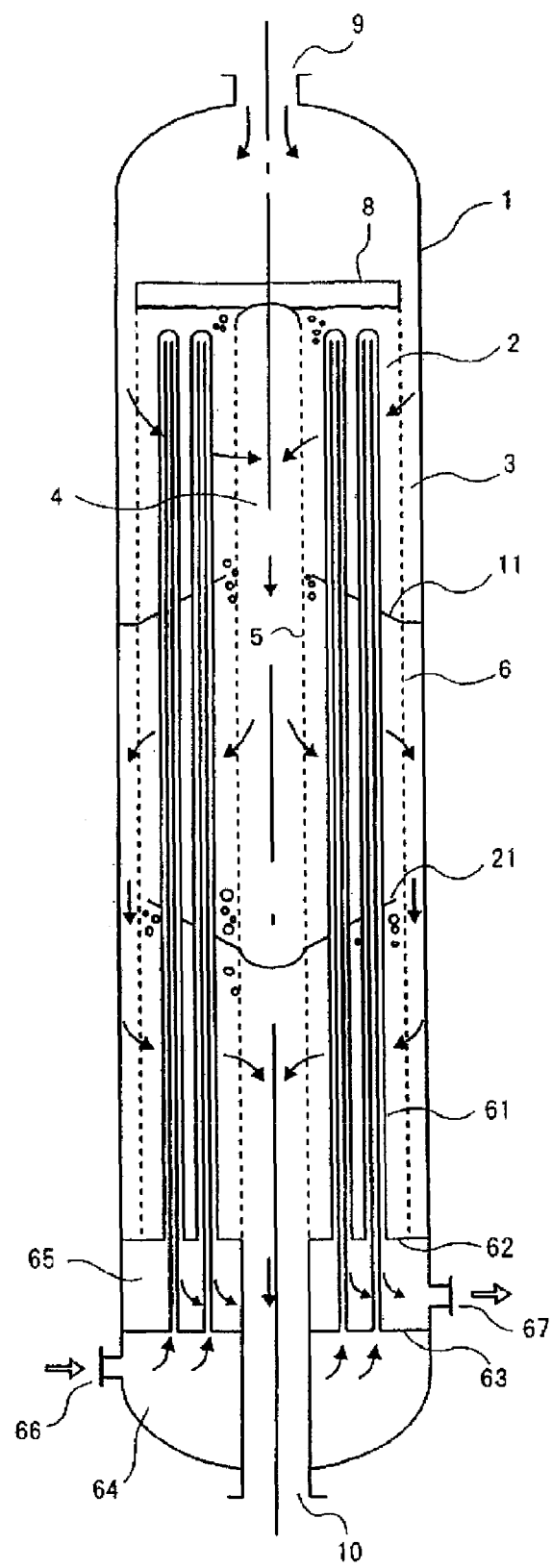
FIG. 6 is a schematic view of an axial cross section for illustrating another embodiment of the reactor of the present invention.

FIG. 6 illustrates another embodiment of the reactor of the present invention. This embodiment is an embodiment in which heat transfer tubes 61 for heating or cooling the reactor are added to the embodiment illustrated in FIG. 1. The reactor vessel 1 includes the heat transfer tubes 61 thereinside. Heat transfer medium (heating medium or cooling medium) can flow through the heat transfer tubes. Here, the heat transfer tube has a double-tube structure. Inside the reactor vessel, a tubesheet 63 to which the inner tubes of the heat transfer tubes are fixed and a tubesheet 62 to which the outer tubes of the heat transfer tubes are fixed are provided in this order from the bottom. A space between the lower cover of the reactor vessel and the tubesheet 63 forms an inlet side header 64 for the heat transfer medium, and a space between the tubesheet 63 and the tubesheet 62 forms an outlet side header 65 for the heat transfer medium. Further, the tubesheet 62 defines the lower ends of the packing region and the outer passage. The center pipe 5 penetrates the outlet side header and the inlet side header of the heat transfer medium to be connected to the fluid outlet 10. The portions of the center pipe extending through the headers have no through-holes.

For example, when the reactor, particularly the packed bed is cooled by way of the heat transfer tubes, water (boiler feed water) is supplied as the heat transfer medium from a heat transfer medium inlet 66 to the inlet side header 64. While the water is flowing through the inner tubes and the outer tubes of the heat transfer tubes 61, the water is heated, and hot water or steam is collected from the outer tubes to the outlet side header 65 and is discharged from a heat transfer medium outlet 67.

The partition plate may support the heat transfer tubes. More specifically, at least one of the outer partition plate and the inner partition plate may serve as a baffle plate which supports the heat transfer tubes. This structure is simple and effective.

It can be said that, in the reactor of the present invention, a continuous packed bed is narrowed by a partition plate, and thereby a multi-pass structure is obtained.

According to the present invention, granular packing, such as catalyst or absorbent, can move beyond the partition plate, and therefore it is easy to carry out loading and unloading of the packing without accessing the partition structure. Further, also when the packing shrinks during reactor operation, the packing can move autonomously in the packing region. Since there is no need to access the partition structure, the reactor of the present invention is particularly useful when there is a member which disturbs access to the partition structure, such as the heat transfer tubes provided in the packed bed.

Moreover, the present invention can prevent the phenomenon that the fluid takes a shortcut without passing through the packed bed in the radial direction, and therefore does not impair the reaction performance of the reactor.

1: reactor vessel
2: packing region
3: outer passage
4: inner passage
5: center pipe
6: outer basket
7: scallop
8: lid for closing upper end of outer basket
9: fluid inlet
10: fluid outlet
11: outer partition structure
12: outer partition plate
13: outer blocking section
13a: annular plate
13b: tubular member
14: tie rod for supporting partition plate
15: tube for unloading granular packing
21: inner partition structure
22: inner partition plate
22a: annular plate
22b: tubular member
23: inner blocking section
25: tube for unloading granular packing
61: heat transfer tube (double tube)
62: tubesheet for fixing outer tube
63: tubesheet for fixing inner tube
64: inlet side header for heat transfer medium
65: outlet side header for heat transfer medium
66: heat transfer medium inlet
67: heat transfer medium outlet
W1: width of gap between inner end of outer partition plate and center pipe
W2: width of gap between outer end of inner partition plate and outer basket
θ1: angle between outer partition plate and the horizontal
θ2: angle between inner partition plate and the horizontal

What is claimed is:

1. A reactor comprising, in an upright disposed tubular reactor vessel:
a packing region which is a region for housing a continuous packed bed of granular packing; and
an outer passage and an inner passage disposed outside and inside the packing region, respectively, in a cross section perpendicular to the axial direction of the reactor vessel, each of the outer and inner passages allowing a fluid to flow therethrough in the axial direction,
the reactor being configured so that the fluid is able to pass between the packing region and the outer passage and the fluid is able to pass between the packing region and the inner passage, wherein
the reactor further comprises at least one of the partition structures from among:
an outer partition structure comprising: an outer partition plate which is a partition plate partitioning the packing region in the axial direction with a gap through which the granular packing is able to pass between an inner border of the packing region and said outer partition plate; and a blocking section for preventing the fluid from flowing through the outer passage in the axial direction; and
an inner partition structure comprising: an inner partition plate which is a partition plate partitioning the packing region in the axial direction with a gap through which the granular packing is able to pass between an outer border of the packing region and said inner partition plate; and a blocking section for preventing the fluid from flowing through the inner passage in the axial direction,
wherein in said at least one of the partition structures, the partition plate has an upward inclination toward a side having the gap.

2. The reactor according to claim 1, wherein the inclination has an angle of from 15° to 50°.

3. The reactor according to claim 1, wherein the angle of the inclination is equal to or greater than an angle of repose of the granular packing.

4. The reactor according to claim 1, wherein at least one partition plate amongst the outer partition plate and inner partition plate is equipped with a tube for unloading the granular packing.

5. The reactor according to claim 1, wherein the reactor comprises a heat transfer tube inside the packing region.

6. The reactor according to claim 5, wherein the heat transfer tube is supported by at least one partition plate amongst the outer partition plate and inner partition plate.

* * * * *